(12) United States Patent
von Mutius et al.

(10) Patent No.: US 8,247,913 B2
(45) Date of Patent: Aug. 21, 2012

(54) METHOD AND SYSTEM FOR OPERATING A WIND ENERGY INSTALLATION

(75) Inventors: Martin von Mutius, Ascheffel (DE); Roland Weitkamp, Belm (DE); Jochen Anemueller, Hasbergen (DE)

(73) Assignee: REpower Systems AG, Hamburg (DE)

( * ) Notice: Subject to any disclaimer, the term of this patent is extended or adjusted under 35 U.S.C. 154(b) by 313 days.

(21) Appl. No.: 12/428,255

(22) Filed: Apr. 22, 2009

(65) Prior Publication Data
US 2009/0261588 A1 Oct. 22, 2009

(30) Foreign Application Priority Data

Apr. 22, 2008 (DE) .......................... 10 2008 020 154

(51) Int. Cl.
*H02P 9/04* (2006.01)
(52) U.S. Cl. ................................. 290/44; 290/55; 416/1
(58) Field of Classification Search .............. 290/43–44, 290/54–55; 415/1; 416/1; 60/398
See application file for complete search history.

(56) References Cited

U.S. PATENT DOCUMENTS

| | | | |
|---|---|---|---|
| 5,289,041 A | 2/1994 | Holley | |
| 6,726,439 B2 * | 4/2004 | Mikhail et al. | 415/4.1 |
| 7,586,205 B2 * | 9/2009 | Krueger | 290/44 |
| 2002/0000723 A1 | 1/2002 | Weitkamp | |
| 2006/0002791 A1 | 1/2006 | Moroz | |
| 2007/0018457 A1 * | 1/2007 | Llorente Gonzalez | 290/44 |
| 2008/0290664 A1 * | 11/2008 | Kruger | 290/55 |
| 2009/0001724 A1 * | 1/2009 | Lee et al. | 290/44 |

FOREIGN PATENT DOCUMENTS

| | | |
|---|---|---|
| DE | 29623937 | 10/2000 |
| DE | 10011393 | 9/2001 |
| DE | 102004007487 | 9/2005 |
| DE | 102005034899 | 2/2007 |
| DE | 102006034106 | 4/2007 |
| DE | 102006036157 | 2/2008 |

OTHER PUBLICATIONS

European Search Report dated Apr. 6, 2011 directed to application No. 09005310.9; 6 pages.

* cited by examiner

*Primary Examiner* — Michael Zarroli
(74) *Attorney, Agent, or Firm* — Morrison & Foerster LLP (57) ABSTRACT

A method for operating a wind energy installation and a system for implementing the method. An oblique incident flow value, which represents the difference between the wind direction and the direction of a rotor axis of the wind energy installation, and a load value, which represents the load state of the wind energy installation, are determined. A total load value is determined based on the load value and the oblique incident flow value. The rotor rotation speed is reduced when the total load value is above a first limit value. The wind energy installation is shut down when, in addition, a second limit value is exceeded. The method makes it possible to react objectively to oblique incident flows and can reduce a load on a wind energy installation without causing large yield losses.

18 Claims, 3 Drawing Sheets

METHOD AND SYSTEM FOR OPERATING A WIND ENERGY INSTALLATION

REFERENCE TO RELATED APPLICATIONS

This application claims the priority of German Patent Application No. 10 2008 020 154.5, filed Apr. 22, 2008, the contents of which are incorporated herein by reference.

FIELD OF THE INVENTION

The invention relates to a method for operation of a wind energy installation. In the method, an oblique incident flow value is determined which represents the difference between the wind direction and the direction of the rotor axis of the wind energy installation. If the oblique incident flow value exceeds a predetermined limit value, then the rotor rotation speed of the wind energy installation is reduced. The invention also relates to an arrangement for carrying out the method. The arrangement comprises a wind energy installation and a wind direction gauge, with a control unit being provided, which reduces the rotor rotation speed of the wind energy installation when the oblique incident flow detected by the wind direction gauge exceeds a predetermined limit value.

BACKGROUND OF THE INVENTION

For operation of wind energy installations, it is best for the wind conditions to be constant and for the wind to arrive at the wind energy installation as parallel to the rotor axis as possible. In practice, such ideal conditions frequently do not occur, and continual changes in the wind conditions must be coped with. From experience, a particularly high load for wind energy installations occurs when the wind arrives at the wind energy installation obliquely. Depending on the angular position, the rotor blades are then subject to different loads during revolution. This causes vibration, which can be transmitted from the rotor blades via the rotor shaft into the foundation of the wind energy installation.

DE 10 2006 034 106 A1 discloses a method in which the rotor rotation speed is reduced when the angle of the oblique incident flow, that is to say the angle between the instantaneous wind direction and the rotor axis, becomes too great. This method can admittedly in principle contribute to reducing the load on the wind energy installation. However, because of the very simple criterion on which the reduction of the rotation speed is made dependent, the rotor rotation speed is often also reduced when the wind energy installation is not actually subject to any particular load. This leads to unnecessary yield losses.

SUMMARY OF THE INVENTION

Against the background of the initially cited prior art, the invention is based on the object of providing a method and an arrangement by means of which the load caused by an oblique incident flow on wind energy installations can be reduced objectively. The object is generally achieved by the features of the invention as broadly described herein. Advantageous embodiments can be found in the detailed description below.

According to the invention, in the method, in addition to the oblique incident flow value which represents the difference between the wind direction and the direction of the rotor axis of the wind energy installation, a load value is determined which represents the load state of the wind energy installation. A total load value is calculated on the basis of a functional relationship from the load value and the oblique incident flow value. The functional relationship is such that the total load value varies monotonically as a function of the load value and as a function of the oblique incident flow value. The rotor rotation speed of the wind energy installation is reduced after the total load value has exceeded a first limit value. The wind energy installation is shut down when the total load value is above the first limit value and, in addition, a second limit value, which is dependent on the total load of the wind energy installation, has been exceeded. The rotor rotation speed can be reduced and the wind energy installation shut down immediately if the first and the second limit value are exceeded. Alternatively, it is possible for the first and/or the second limit value to have to be exceeded for a predetermined time interval before the rotation speed is reduced or the wind energy installation is shut down.

A number of terms will be explained first of all. The expression an oblique incident flow is used when the wind direction differs from the direction of the rotor axis in the horizontal and/or in the vertical direction. The oblique incident flow value is based on one or more measured values of the wind direction. In the simplest case, the oblique incident flow value corresponds to the angle between the instantaneously measured wind direction and the rotor axis. The oblique incident flow value can also be determined on the basis of a plurality of measured values, for example by spatial or time averaging. Simple averages, sliding averages or else non-linear averages can be provided. In the case of non-linear averaging, measured values which indicate a very major difference between the wind direction and the direction of the rotor axis can be taken into account in the averaging process more than proportionally, for example using a square law, cube law or exponential law. Furthermore, the oblique incident flow value can be used to take account of the angular velocity at which the wind direction is changing. The manner in which the measured value of the wind direction is obtained is irrelevant. The measured value may be based on the position of a wind vane. It is also possible to obtain information about the wind direction from measured values from adjacent wind energy installations. Another possibility is to subject an elongated element, which is provided with a certain amount of elasticity, to the wind, and to measure the direction in which the element bends. The wind direction can also be determined with the aid of ultrasound anemometers.

The load acting on a wind energy installation is reflected in various values which may be recorded on a wind energy installation. For example, the load on a wind energy installation rises somewhat as the rotor rotation speed rises or as the generator power rises. One particular load on the wind energy installation can also be expressed by operating parameters on the wind energy installation being outside the envisaged range. Furthermore, the load on the wind energy installation can also be reflected in a load, stress or deformation of the rotor blades, in a load, stress, deformation or vibration of components of the wind energy installation, in the pitch angle of the rotor blades or accelerations of the tower head. It is also feasible to determine the load on a wind energy installation indirectly, for example by using the wind strength to deduce the load on the wind energy installation. However, in practice, it is difficult to measure the wind speed exactly. The load value to be determined according to the invention is based on measured values which reflect the load on the wind energy installation. Measured values of one or more states or characteristics of the wind energy installation may be included in the load value.

The functional relationship between the total load value, the oblique incident flow value and the load value is recorded monotonically when the total load value is subject to a change in the same direction, when the oblique incident flow value reflects a rise in the oblique incident flow and when the load value reflects a rise in the load on the wind energy installation. In the simplest case, the oblique incident flow value and the load value are defined such that they assume greater values when the oblique incident flow and/or the load rise or rises. The monotonic functional relationship may then be such that the total load value rises both with an increasing oblique incident flow value and with an increasing load value, that is to say such that the gradient of the function is greater than or equal to zero everywhere, depending on both variables. Without changing the technical effect, the functional relationship may also be such that the total load value falls monotonically as the oblique incident flow increases and as the load increases. Furthermore, without changing the technical effect, it is possible to define the oblique incident flow value and/or the load value such that they become less as the oblique incident flow increases and/or as the load on the wind energy installation increases.

The wording that "a second limit value, which is directly or indirectly dependent on the total load of the wind energy installation, is exceeded" relates to precisely two cases which are technically equivalent. In the first case, the wind energy installation is shut down after the total load value has exceeded a second limit value, with the second limit value corresponding to a greater total load of the wind energy installation than the first limit value. In the second case, the wind energy installation is shut down after a parameter which varies as a consequence of the rotation-speed reduction of the wind energy installation has exceeded a predetermined limit value. If the total load which is represented by the total load value rises further after the first limit value has been exceeded, then a measure is taken in order to reduce the total load. For example, the rotation-speed reduction may be proportional to the oblique incident flow value and/or proportional to the load value and/or proportional to the total load value. This measure once again results in the parameter being varied. If the parameter now exceeds a predetermined limit value, then the installation is shut down. This shut-down criterion occurs only when the total load value at the same time has a value which could be used as a shut-down criterion. However, formally, the shut-down process does not depend directly on the total load value. If the rotor rotation speed decreases, for example as a consequence of a further rise in the total load beyond the first limit value, then the undershooting of a rotation-speed lower limit can be used as a shut-down criterion. The undershooting of a power lower limit or the like can also be used.

A number of aspects are linked to one another in the method according to the invention. Since the load to which the wind energy installation is actually subject is estimated using the total load value on the basis of the oblique incident flow value, the decision to reduce the rotor rotation speed is made dependent on a criterion which is very close to what should be influenced, specifically the total load on the wind energy installation. In contrast to the situation in the prior art, the reduction in the rotor rotation speed is no longer dependent solely on a criterion which, although it is an indicator of the total load on the wind energy installation, too frequently leads to a reduction in the rotor rotation speed, however, as well when the total load on the wind energy installation is still in an acceptable range. The method according to the invention thus makes it possible to use the measure of reducing the rotor rotation speed more objectively than was possible in the prior art.

Furthermore, the invention has found that an oblique incident flow can cause load peaks in the wind energy installation which can have an extraordinarily negative influence on the life of the wind energy installation and on its components. For example, load peaks occur when the wind energy installation is operated at rated power or slightly below rated power and the wind suddenly changes to a different direction, as a result of which an incident flow strikes the rotor at an angle of, for example, 45°. It is particularly critical when the wind direction change is associated with an increase in the wind speed (gust). A situation such as this loads the wind energy installation so severely that this may actually not be acceptable in the short term. Load peaks such as these can be identified, and the wind energy installation can then be shut down, on the basis of the total load of the wind energy installation as determined according to the invention. This also admittedly leads to a yield loss, but the loss caused by this is far less than the loss which would be associated with a shorter life of the wind energy installation. In this situation as well, it is therefore possible to react more objectively to oblique incident flows than in the prior art.

The proposal to shut down a wind energy installation when the oblique incident flow is severe has admittedly already been made in the prior art (US 2006/0002791 A1). However, US 2006/000279 A1 has nothing to do with the problem according to the invention of making it possible to react objectively to oblique incident flows, because this document actually lacks the idea of reacting differently to different load situations.

In particular, the invention makes it possible to record the total load on a wind energy installation very accurately in the particularly critical region of the rated wind speed, that is to say the wind speed at which the wind energy installation actually reaches the rated power, and to operate it with a severe oblique incident flow in such a way that impermissible loads are safely avoided, while at the same time, however, maximizing the energy yield, that is to say in particular in the region of the rated wind speed, the wind energy installation can be operated close to its permissible load limits. This was not possible with the already known methods.

In one simple case of the method according to the invention, the load value is made equal to 0 when the measured value (for example the rotor rotation speed) on which the load value is based is below a predetermined value (for example half the rated rotation speed), and the load value is made equal to 1 when the measured value is above the predetermined value. The oblique incident flow value is correspondingly equal to 0 when the measured value (for example the angle between the instantaneous wind direction and the rotor axis) used as the basis is below a first predetermined value (for example 30°), is equal to 1 when the measured value is above the first predetermined value, and is equal to 2 when the measured value is above a second predetermined value (for example 45°). The total load value can then be calculated by multiplying the load value by the oblique incident flow value, and the rotor rotation speed is reduced when the total load value is greater than or equal to 1, and the wind energy installation is shut down when the total load value is greater than or equal to 2. The values 0, 1, 2 are used only for illustrative purposes, and the same technical effect can be achieved with any other desired numbers, in which case the numbers may also have a different magnitude ratio to one another. In this embodiment, the technical effect of the method according to the invention is comparable with a method in which a plurality of logic questions are combined with one another. One specific independent claim makes it clear that this embodiment is also covered by the subject matter for which protection is sought.

The oblique incident flow value can alternatively be determined on the basis of a plurality of variables which represent the wind direction. A first variable (for example normal averaging of the wind direction measured values) is characteristic of load states which can be counteracted by reducing the rotor rotation speed. A second variable (for example square averaging of the wind direction measured values) is characteristic of load states in which the wind energy installation should be shut down. The oblique incident flow value is made equal to 1 when the first variable exceeds a first predetermined limit value, and is made equal to 2 when the second variable exceeds a second predetermined limit value. There is no need for the second predetermined limit value to be greater than the first predetermined limit value. The second predetermined limit value may also be less than or equal to the first predetermined limit value. In its technical effect, this method is also similar to a combination of a number of logic questions. A specific independent claim makes it clear that this embodiment is covered by the subject matter for which protection is sought.

However, the advantages of the method according to the invention become more important than in the case of the present examples when the oblique incident flow value and the load value do not just reflect that individual limit values have been exceeded, but when they are defined such that their value in each case becomes greater the greater the respective contribution is to the total load on the wind energy installation. The total load value then provides a more exact picture of the total load to which the wind energy installation is subject.

If the load value is determined on the basis of, for example, the rotor rotation speed or the generator power, then the load value is only a general indicator of the basic load on the wind energy installation. If the basic load is high and the oblique incident flow value also indicates that the wind energy installation has an oblique incident flow on it, then the wind energy installation is subject to a total load which makes it necessary to reduce the rotor rotation speed or to shut down the wind energy installation. If the method according to the invention is carried out in this way, then it is evident that the oblique incident flow value is an exact indicator that the wind energy installation actually has an oblique incident flow on it. However, it is evident that this is not the case in many situations. If the wind direction is measured by a wind vane fitted on the wind energy installation, then very minor and locally restricted air vortices can lead to the wind vane indicating high oblique incident flow angles. If the oblique incident flow value is based on the wind direction measured values of the wind vane, then, in a situation such as this, it indicates a severe oblique incident flow even though the rotor is not subject to any oblique incident flow at all overall. The total load value becomes so large that the rotor rotation speed is reduced or the wind energy installation is shut down even though the wind energy installation is actually subject only to the basic load. This leads to unnecessary yield losses.

The validity of the total load value can be improved by determining the load value such that it is at the same time an indicator that the wind energy installation is subject to an oblique incident flow. This is achieved, for example, when the load value is determined on the basis of a load on components of the wind energy installation. The term load refers to a strain, stress or deformation in the material which is caused by a force acting on the material from the outside. The load may be cyclic or may be expressed in the form of vibration. Loads in the components of a wind energy installation may admittedly also have other causes, but it has been found that loads are frequently related to an oblique incident flow. If both the load value based on a load and the oblique incident flow value are now high, then the high total load value which results from this is a major indicator that the wind energy installation is actually subject to a high total load as a result of an oblique incident flow.

Loads exist which can be associated with an oblique incident flow, with a particularly high probability. This applies, for example, to loads in which the rotor blades bend more severely at specific angular positions during a revolution than at other angular positions. For example, the bending on the rotor blades can be measured by means of strain gauges, and the load value can be determined from the measured values from the strain gauges.

If the total load value indicates a situation in which the wind energy installation is subject to a high total load as a result of an oblique incident flow, and in which the rotor blades are at the same time bent more severely at specific angular positions than at other angular positions, then it is possible to further reduce the total load on the wind energy installation by cyclic pitching. In the case of cyclic pitching, the rotor blades are pitched periodically in order to reduce the load, with the period of pitching corresponding to the rotation speed of the rotor.

A further contribution to reducing the load on the wind energy installation can be achieved by realigning the wind energy installation such that the difference between the wind direction and the rotor axis is reduced. If the wind energy installation has been shut down after the total load value has exceeded the second limit value, the realignment process should be started immediately after the shutdown. If the rotor rotation speed has merely been reduced, it is possible first of all to wait for a brief time interval, to determine whether the wind will swing back, before realigning the wind energy installation. Alternatively, the alignment process can also be started immediately when the total load value exceeds the first limit value. In addition, the total load value can be used to decide whether to realign the wind energy installation, without any limit value being exceeded.

The wind energy installation is subject to a particular load when the wind direction changes and the wind strength rises at the same time. Since a rising wind strength leads to a brief rise in the rotor rotation speed, this situation can be considered by the load value being determined on the basis of an increase in the rotor rotation speed. If the rotation speed is kept constant by the control system at rated power, it is possible, instead of this, to determine the load state for example on the basis of an increase in the torque or some other load.

If the total load value exceeds the first limit value, then the reaction predetermined by the method according to the invention may comprise the rotor rotation speed being reduced by a fixed amount. By way of example, the rotor rotation speed can be reduced from 100% of the rotor rotation speed to 90% of the rotor rotation speed. Alternatively, the rotor rotation speed can be reduced continuously or in a plurality of steps, as a result of which the extent to which it is reduced below the rated rotation speed becomes greater the greater the extent to which the total load value exceeds the first limit value. If the second limit value is then also exceeded, then a direct shutdown signal can be triggered, which results in the wind energy installation being shut down. It is likewise possible to reduce the rotor rotation speed such that it undershoots a rotation-speed lower limit when the total load value exceeds the second limit value. When the rotation-speed lower limit is undershot, the wind energy installation is shut down. The undershooting of the rotation-speed lower limit is therefore a shut-down signal which is indirectly linked to the second limit value.

In addition to reducing the rotor rotation speed, it is also possible to reduce the generator power when the total load value exceeds the first limit value. This may be reduced by a fixed amount, for example from 100% of the rated power to 85% of the rated power. Alternatively, the generator power can be reduced continuously or in a plurality of steps, the greater the extent to which the total load value exceeds the first limit value. In order to avoid excessively abrupt changes in operation of the wind energy installation, the rotation speed or the power is preferably reduced by ramped set-value reductions, that is to say, for example, the rotation-speed set value is reduced from 100% to 90% or 80% over a predetermined ramp time, for example of 5s.

In order to keep the yield loss low, it is desirable to keep the time intervals in which the wind energy installation is operated at reduced rotation speed as short as possible. It is feasible to increase the rotor rotation speed again immediately when the total load value falls below the first limit value. However, when the winds are irregular, this can lead to the rotor rotation speed being permanently accelerated and decelerated. For this reason, the rotation-speed reduction is preferably only reversed when the total load value has been below the first limit value for a predetermined time period, in particular of 20 seconds, preferably of 10 seconds, and furthermore preferably of 5 seconds. Alternatively, the rotation-speed reduction can also be reversed when the total load value is below the first limit value by a predetermined amount (hysteresis). If the wind is very irregular, it may be preferable for the wind energy installation to be operated at a reduced rotor rotation speed even over a relatively long time period. This can be done, for example, by reversing only a certain number of rotation-speed reductions again within a predetermined time period, for example a maximum of 10 rotation-speed reductions in 120 minutes, with the wind energy installation otherwise remaining at that reduced rotation speed for a further 120 minutes.

The arrangement according to the invention comprises a first evaluation unit for determination of an oblique incident flow value from measured values of the wind direction gauge, and a second evaluation unit for determination of a load value from measured values of the load sensor. A computation module is also provided which calculates a total load value from the load value and the oblique incident flow value. The computation module uses a functional relationship according to which the total load value (G) varies monotonically as a function of the load value (B) and as a function of the oblique incident flow (S). Finally, the arrangement comprises a control unit which reduces the rotor rotation speed of the wind energy installation when the total load value is above a first limit value, and which shuts down the wind energy installation when a second limit value, which is dependent on the total load, is also exceeded.

The load sensor may be a sensor for the rotor rotation speed or a sensor for the generator power. The load sensor may also be a sensor for the load, stress and/or bending of the rotor blades, a sensor for acceleration or a sensor for vibration. The load sensor may also be a sensor for the load, stress or deformation of the tower, rotor shaft, rotor blade or some other component of the wind energy installation.

The wind direction gauge may be a wind vane or an ultrasound anemometer which can be arranged on the wind energy installation or elsewhere. In particular, the wind direction measured values can originate from another wind energy installation. The other wind energy installation is preferably located upstream of the wind energy installation of the arrangement according to the invention, seen in the wind direction. The wind direction gauges can be designed such that they can detect not only the horizontal wind direction but also the vertical wind direction, for example, by means of a wind vane with a horizontal rotation axis fitted to the side of the pod.

The control unit can be designed such that it reduces the rotor rotation speed or shuts down the installation immediately when the first or second limit value, respectively, is exceeded. Alternatively, the control unit can be designed such that a predetermined time interval is first of all allowed to elapse. A conventional counter or an up/down counter can be provided in order to measure the time interval.

The invention will be described by way of example in the following text using advantageous embodiments and with reference to the attached drawings, in which:

DETAILED DESCRIPTION OF THE INVENTION

Figure 1:
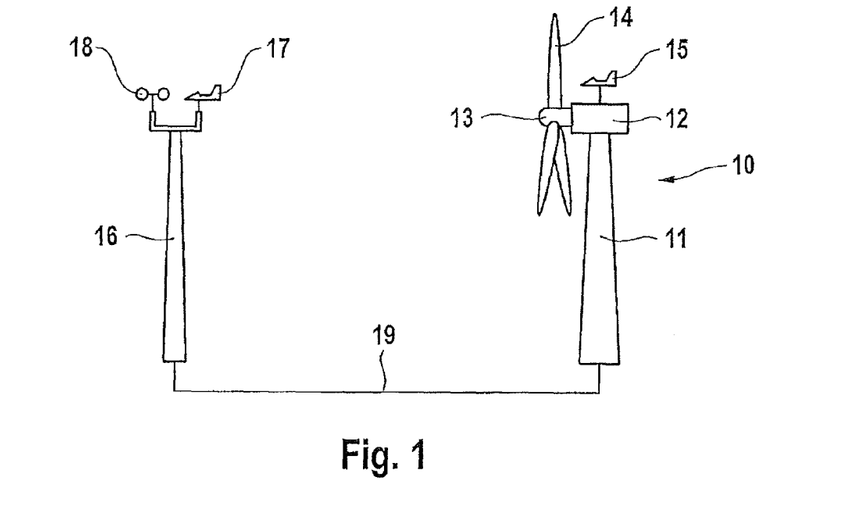
FIG. 1 shows an arrangement according to the invention.

A wind energy installation 10 in FIG. 1 comprises a pod 12 which is arranged on a tower 11 and has a rotor 13. The rotor 13 comprises three rotor blades 14 whose pitch is variable, in order to control the rotation speed of the rotor 13. A wind direction gauge in the form of a wind vane 15, possibly as well as a wind strength gauge, which is not illustrated, in the form of an anemometer, are or is fitted to the pod 12.

A mast 16 is erected in front of the wind energy installation 10, and a further wind vane 17 and wind strength gauge 18 are arranged at the top of this mast 16. The measured values of the wind direction gauge 17 and of the wind strength gauge 18 are recorded and are transmitted via a cable 19 to the wind energy installation 10. As an alternative to the measurement mast, it is also possible to use ground-based appliances which can measure the wind speed at the hub height (for example Lidar or Sodar).

Figure 2:
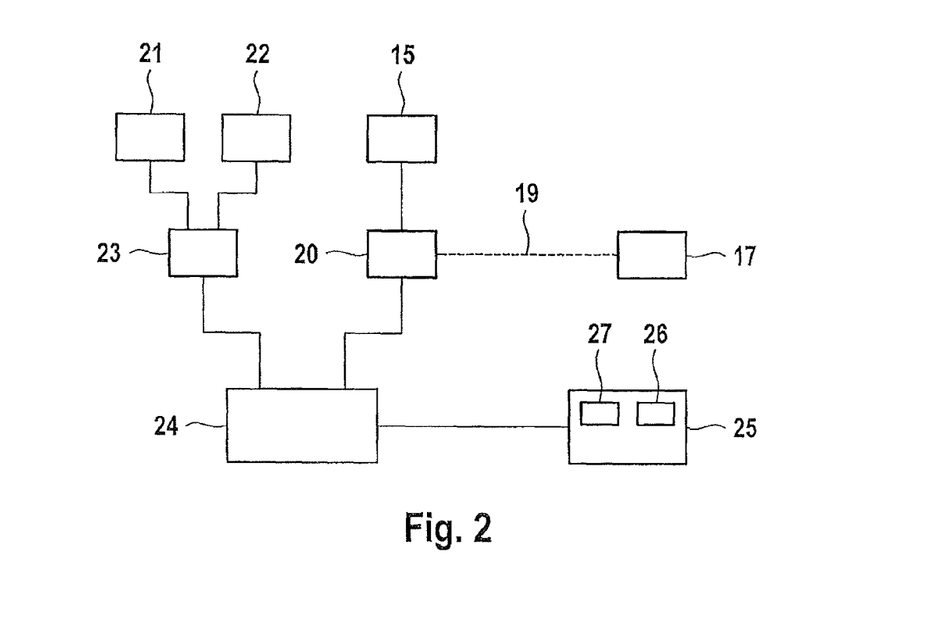
FIG. 2 shows a schematic illustration of elements on the wind energy installation shown in FIG. 1.

According to FIG. 2, an evaluation unit 20 is arranged in the wind energy installation 10 and determines an oblique incident flow value from the measured values of the wind vanes 15 and 17. To this end, the evaluation unit 20 first of all determines a mean value between the wind direction measured values of the wind vane 15 and of the wind vane 17, and associates the mean value obtained in this way with an oblique incident flow value S.

The wind energy installation 10 furthermore comprises two load sensors 21, 22 which record measured values relating to the instantaneous load on the wind energy installation 10. For example, the load sensor 21 may be a sensor for the rotor rotation speed, and the load sensor 22 may be a sensor for the bending of the rotor blades 14. The measured values of the load sensors 21, 22 are passed to a second evaluation unit 23. The evaluation unit 23 combines the measured values from the load sensors 21, 22 and associates them with a load value B.

The oblique incident flow value S determined in the evaluation unit 20, and the load value B determined in the evaluation unit 23, are passed to a computation module 24. The computation module 24 calculates a total load value G from the oblique incident flow value S and the load value B, using a functional relationship. In this case, the functional relationship is a multiplication such that the total load value G is equal to the product of the oblique incident flow value S and the load value B.

The total load value G is passed on to a control unit 25 for the wind energy installation 10. The control unit 25 has a counter 26 and a comparison module 27. The total load value G is permanently compared with a first predetermined limit value and with a second predetermined limit value in the comparison module 27. The counter 26 detects the time period for which the total load value G is above the first and/or above the second limit value.

The described arrangement may, for example, be used to determine the oblique incident flow value S and the load value B such that the total load value G is greater than the first limit value when the wind energy installation is running at its rated rotation speed and when the wind is incident on the rotor 13 at an angle α of more than 30°. If the control unit 25 finds that this state is present for more than 15 seconds, then the control unit 25 reduces the rotation speed of the wind energy installation to 90% of the rated rotation speed. The total load value G exceeds the second predetermined limit value when the wind energy installation 10 is running at its rated rotation speed and the wind is incident on the rotor 13 at an angle α of more than 60°. If the control unit 25 finds that this state is present for more than 2 seconds, the control unit 25 issues the command to shut down the wind energy installation.

Figure 6:
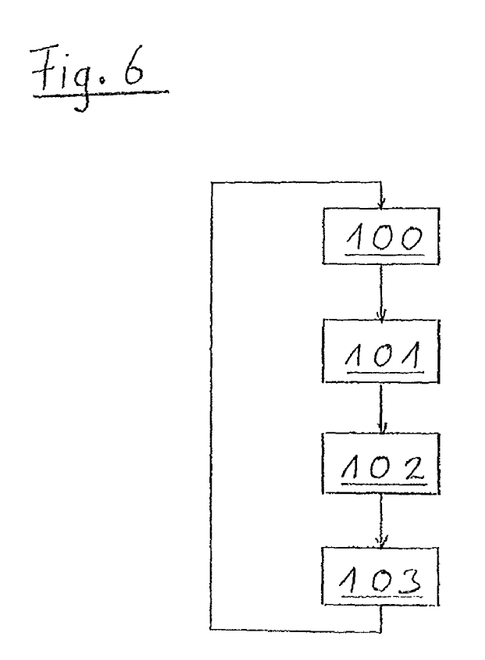
FIG. 6 shows a process according to an embodiment in which the wind energy installation can be realigned.

FIG. 6 illustrates a process according to an embodiment in which the wind energy installation can be realigned. In step 100, the total load value G can be defined such that the first limit value is exceeded when the oblique incident flow angle α is greater than 30° and the load sensor 21 signals that the rotor rotation speed has risen over a time period of more than 3 seconds. In step 101, in the control unit 25, this initiates the command to reduce the rotor rotation speed to 90% of the rated rotation speed. In step 102, once the wind energy installation has stabilized at the new rotor rotation speed, wind readjustment is started, that is to say the wind energy installation 10 is aligned with the new wind direction.

In step 103, if the counter 26 in the control unit 25 then finds that the total load value G is below the first limit value once again for 5 seconds, the control unit 25 issues the command to increase the rotor rotation speed to the rated rotation speed again.

If the counter 26 in the control unit 25 then finds that the total load value G is below the first limit value once again for 5 seconds, the control unit 25 issues the command to increase the rotor rotation speed to the rated rotation speed again.

Figure 3:
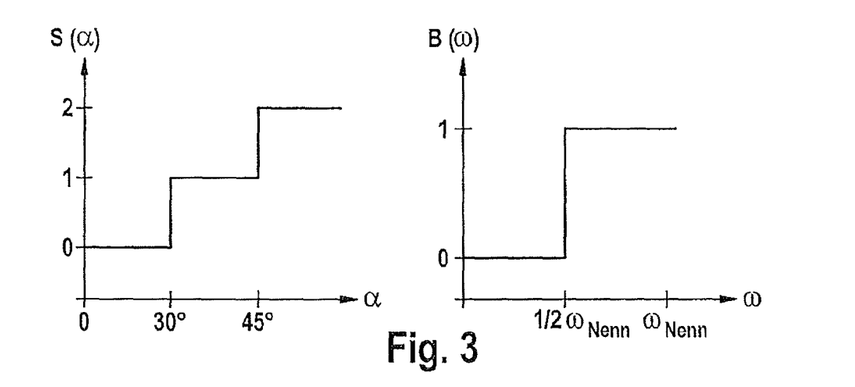
FIGS. 3-5 show examples for determination of the oblique incident flow values and load values.
Figure 4:
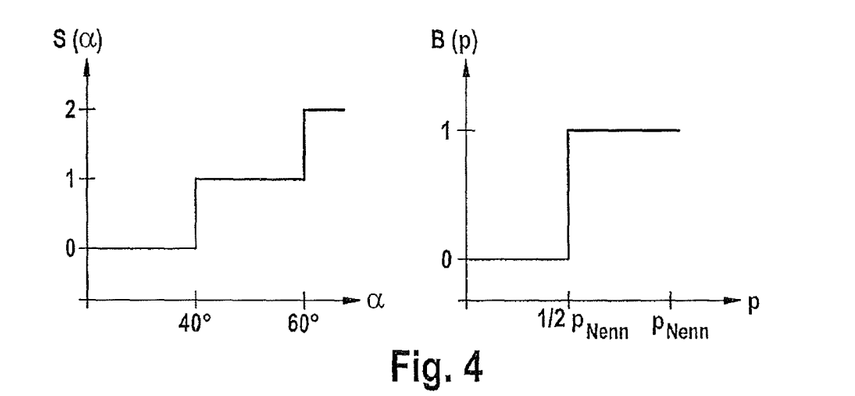
Figure 5:
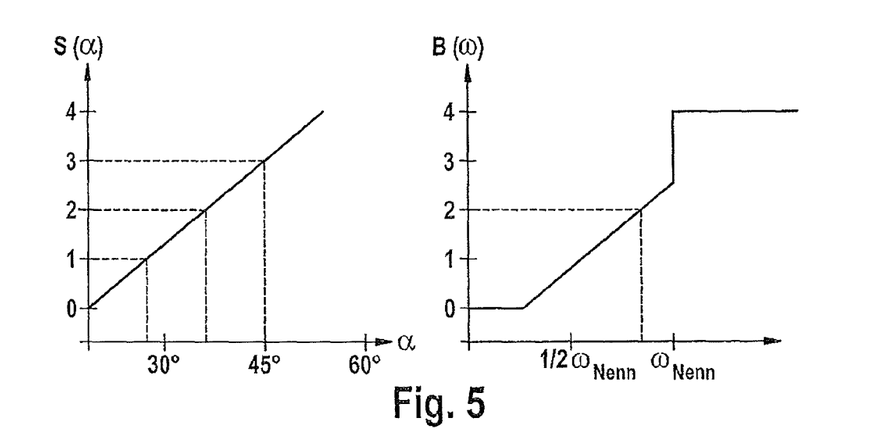

FIGS. 3 to 5 show further embodiments of the method according to the invention. FIG. 3 shows the evaluation unit 20 in such a way that it allocates the value 0 to the oblique incident flow value S(α) when the oblique incident flow angle α is between 0° and 30°, allocates the value 1 when the oblique incident flow angle α is between 30° and 45°, and allocates the value 2 when the oblique incident flow angle α is more than 45°. In the evaluation unit 23, the value 0 is allocated to the load value B(ω) when the rotor rotation speed ω is below half the rated rotation speed $ω_{rated}$, and the value 1 is allocated when the rotor rotation speed ω is above half the rated rotation speed $ω_{rated}$. Limits of 80% or 90% of the rated rotation speed have also been proven instead of half the rated rotation speed $ω_{rated}$. The total load value G(B,S) is calculated as the product of the load value B (ω), and the oblique incident flow value S(α). The first limit value has the value 1, the second limit value has the value 2. The rotor rotation speed is reduced when the total load value G(B,S) is greater than or equal to 1, and the wind energy installation 10 is shut down when the total load value G(B,S) is greater than or equal to 2.

In the embodiment shown in FIG. 4, the load value B (p) is determined as a function of the generator power p, with the load value B(p) being equal to 0 below half the rated power $p_{rated}$ and being equal to 1 above half the rated power $P_{rated}$. The oblique incident flow value S(α) has the value 1 when α is between 40° and 60°, and has the value 2 when α is greater than 60°. The first limit value has the value 1 and the second limit value has the value 2. Limits of 65% and 80% of the rated power have also been found to be advantageous, instead of half the rated power.

In FIG. 5, there is a proportional relationship between the oblique incident flow value S(α) and the oblique incident flow angle α. The load value B(ω) has the value 0 when the rotor rotation speed ω is below half the rated rotation speed $ω_{rated}$. The load value B(ω) rises in proportion to the rotor rotation speed ω between half the rated rotation speed $ω_{rated}$ and the rated rotation speed $ω_{rated}$. The load value B(ω) has the value 4 above the rated rotation speed $ω_{rated}$. The total load value G(B,S) is once again calculated as the product of the oblique incident flow value S(α) and the load value B(ω). The first limit value has the value 4, and the second limit value has the value 6.

By way of example, the first limit value is exceeded when the wind energy installation 10 is operated above the rated rotation speed (B(ω)=4) and the oblique incident flow angle α is slightly below 30° (S(α)=1). The first limit value is likewise exceeded when the wind energy installation 10 is operated at 90% of the rated rotation speed $ω_{rated}$ (B(ω)=2) and the oblique incident flow angle α is approximately 35° (S(α)=2). The second limit value is exceeded, for example, at 90% of the rated rotation speed (B(ω)=2) and at an oblique incident flow angle α of 45° (S(α)=3).

The simple examples have been chosen here in order to illustrate that the load value B depends only on the rotor rotation speed and the generator power. In other embodiments, the load value B depends on measured values which may themselves be an indicator of an oblique incident flow. In this case, for example, the measured values relate to vibration in the wind energy installation 10, to loads on components in the wind energy installation 10, or to bending or loading of the rotor blades 14.

In other embodiments, the load value is determined from a link between a plurality of measured values, for example also in the form of logic AND or OR logic operations of a plurality of limit value checks or by means of complex mathematical functions which have a plurality of parameters and reflect the physical relationships of the overall load as a mathematical model. The fundamental mathematical models for the total loads are known in the prior art and have been published, for example, in the form of commercial simulation programs. Preferred measurement variables in this case are not only the abovementioned measurement variables for the loads, but in particular also operating parameters such as power, rotation speed, torque, blade angle, pitch activity (activity of the blade pitch control system, detectable for example via the standard deviation of the blade angle), as well as environmental parameters such as wind speed, wind direction, turbulence intensity, wind gradient, air density, temperature. One particularly preferred simple embodiment of a link such as this provides, for example, for the rotor rotation speed to be reduced when the rotor rotation speed is greater than 80%, in particular 90%, of the rated rotation speed and/or the power is more than 65%, in particular 80%, of the rated power, and an oblique incident flow limit value has additionally been exceeded.

The invention claimed is:

1. A method for operating a wind energy installation, comprising:
    determining an oblique incident flow value at rated wind speed, the oblique incident flow value representing a difference between a wind direction and a direction of a rotor axis of a wind energy installation;
    determining a load value representing a load state of the wind energy installation at rated wind speed, wherein the load value is determined based on an increase in the rotor rotation speed or wherein the load value represents an indicator that the wind energy installation is subject to an oblique incident flow;
    calculating a total load value based on the load value and the oblique incident flow value using a functional relationship in which the total load value varies monotonically as a function of the load value and the oblique incident flow value;
    reducing a rotor rotation speed of the wind energy installation after the total load value has exceeded a first limit value; and
    shutting down the wind energy installation when both the total load value has exceeded the first limit value and a second limit value is exceeded which is directly or indirectly dependent on a total load on the wind energy installation.

2. The method of claim 1, wherein the wind energy installation is shut down after the total load value has exceeded the second limit value, the second limit value corresponding to a greater total load on the wind energy installation than corresponds to the first limit value.

3. The method of claim 1, wherein the wind energy installation is shut down after a parameter of the wind energy installation has exceeded a predetermined limit value, the parameter varying as a consequence of the reduction of the rotor rotation speed.

4. The method of claim 1, 2 or 3, wherein the load value is determined based on at least one of the rotor rotation speed and a generator power.

5. The method of claim 1, 2 or 3, wherein the load value is determined based on a measured value that changes when the wind energy installation is subject to an oblique incident flow.

6. The method of claim 5, wherein the measured value relates to a load on a component of the wind energy installation.

7. The method of claim 5, wherein the measured value relates to a load on rotor blades of the wind energy installation.

8. The method of claim 1, 2 or 3, wherein rotor blades of the wind energy installation are periodically pitched, the period of the pitching corresponding to the rotor rotation speed.

9. The method of claim 1, 2 or 3, wherein the wind energy installation is realigned to reduce the difference between the wind direction and the direction of the rotor axis when the total load value is above at least one of the first limit value and the second limit value.

10. The method of claim 1, 2 or 3, wherein an extent to which the rotor rotation speed is reduced increases as an extent to which the total load value exceeds the first limit value increases.

11. The method of claim 1, 2 or 3, wherein a generator power is reduced after the total load value has exceeded the first limit value.

12. The method of claim 1, 2 or 3, wherein the reduction of the rotor rotation speed is reversed when the total load value is below the first limit value for a predetermined time period, the predetermined time period being between 5 and 20 seconds.

13. A method for operating a wind energy installation, comprising:
    determining an oblique incident flow value at rated wind speed, the oblique incident flow value representing a difference between a wind direction and a direction of a rotor axis of the wind energy installation;
    determining a load value representing a load state of the wind energy installation at rated wind speed, wherein the load value is determined based on an increase in the rotor rotation speed or wherein the load value represents an indicator that the wind energy installation is subject to an oblique incident flow;
    comparing the oblique incident flow value with a first predetermined limit value and a second predetermined limit value;
    comparing the load value with a predetermined value;
    reducing a rotor rotation speed of the wind energy installation when the load value is greater than the predetermined value and the oblique incident flow value is greater than the first predetermined limit value; and
    shutting down the wind energy installation when the load value is greater than the predetermined value and the oblique incident flow value is greater than the second predetermined limit value.

14. A method for operating a wind energy installation, comprising:
    determining a first oblique incident flow value and a second oblique incident flow value at rated wind speed, the first oblique incident flow value and the second oblique incident flow value each representing a difference between a wind direction and a direction of the rotor axis of the wind energy installation;
    determining a load value representing a load state of the wind energy installation at rated wind speed, wherein the load value is determined based on an increase in the rotor rotation speed or wherein the load value represents an indicator that the wind energy installation is subject to an oblique incident flow;
    comparing the first oblique incident flow value with a first predetermined limit value and comparing the second oblique incident flow value with a second predetermined limit value;
    comparing the load value with a predetermined value;
    reducing a rotor rotation speed of the wind energy installation when the load value is greater than the predetermined value and the first oblique incident flow value is greater than the first predetermined limit value; and
    shutting down the wind energy installation when the load value is greater than the predetermined value and the second oblique incident flow value is greater than the second predetermined limit value.

15. A wind energy operating system, comprising:
    a wind energy installation;
    a wind direction gauge;
    a load sensor;
    a first evaluation unit determining an oblique incident flow value at rated wind speed based on measured values from the wind direction gauge, the oblique incident flow value representing a difference between a wind direction and a direction of a rotor axis of the wind energy installation;
    a second evaluation unit determining a load value based on measured values from the load sensor, the load value representing a load state of the wind energy installation at rated wind speed, wherein the load value is determined based on an increase in the rotor rotation speed or wherein the load value represents an indicator that the wind energy installation is subject to an oblique incident flow;

a computation module calculating a total load value based on the load value and the oblique incident flow value using a functional relationship according to which the total load value varies monotonically as a function of both the load value and the oblique incident flow value; and a control unit (i) reducing a rotor rotation speed of the wind energy installation when the total load value is above a first limit value and (ii) shutting down the wind energy installation when a second limit value, which is directly or indirectly dependent on a total load, is exceeded and the total load value is above the first limit value.

16. The system of claim 15, further comprising a second wind direction gauge,
wherein the first evaluation unit determines an average of the measured values of the wind direction gauge and the second wind direction gauge.

17. The system of claim 15, wherein the load sensor comprises at least one of a rotor rotation speed sensor and a generator power sensor.

18. The system of claim 15, wherein the load sensor comprises a sensor for sensing a load, a stress, or a deformation of a tower, a rotor shaft, or a rotor blade of the wind energy installation.

* * * * *

UNITED STATES PATENT AND TRADEMARK OFFICE
CERTIFICATE OF CORRECTION

| | |
|---|---|
| PATENT NO. | : 8,247,913 B2 |
| APPLICATION NO. | : 12/428255 |
| DATED | : August 21, 2012 |
| INVENTOR(S) | : Martin Von Mutius et al. |

It is certified that error appears in the above-identified patent and that said Letters Patent is hereby corrected as shown below:

In the Specification:

At column 9, line numbers 47 to 50, please delete "If the counter 26 in the control unit 25 then finds that the total load value G is below the first limit value once again for 5 seconds, the control unit 25 issues the command to increase the rotor rotation speed to the rated rotation speed again."

Signed and Sealed this
Sixth Day of November, 2012

David J. Kappos
*Director of the United States Patent and Trademark Office*